(12) United States Patent
Krishnamurthy et al.

(10) Patent No.: US 8,776,066 B2
(45) Date of Patent: Jul. 8, 2014

(54) MANAGING TASK EXECUTION ON ACCELERATORS

(75) Inventors: Rajaram B. Krishnamurthy, Wappingers Falls, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 12/627,055

(22) Filed: Nov. 30, 2009

(65) Prior Publication Data

US 2011/0131580 A1 Jun. 2, 2011

(51) Int. Cl.
*G06F 9/46* (2006.01)
*G06F 1/00* (2006.01)

(52) U.S. Cl.
USPC ............ 718/102; 718/104; 713/320; 713/340

(58) Field of Classification Search
USPC ............................... 718/1–105; 713/300–375
See application file for complete search history.

(56) References Cited

U.S. PATENT DOCUMENTS

| | | | |
|---|---|---|---|
| 6,347,328 B1 | 2/2002 | Harper et al. | |
| 6,795,928 B2 | 9/2004 | Bradley et al. | |
| 7,024,671 B2* | 4/2006 | Yamashita | 718/102 |
| 7,043,557 B2* | 5/2006 | Mesarina et al. | 709/231 |
| 7,058,826 B2 | 6/2006 | Fung | |
| 7,174,469 B2 | 2/2007 | Luick | |
| 7,536,461 B2 | 5/2009 | Stecher et al. | |
| 7,694,160 B2 | 4/2010 | Esliger et al. | |
| 7,739,388 B2 | 6/2010 | Wood | |
| 7,770,176 B2 | 8/2010 | Maeda et al. | |
| 7,814,485 B2* | 10/2010 | Morgan et al. | 718/100 |
| 7,844,839 B2 | 11/2010 | Palmer et al. | |
| 8,032,891 B2 | 10/2011 | Chauvel et al. | |
| 8,087,020 B2* | 12/2011 | Kanai et al. | 718/100 |
| 2002/0042887 A1* | 4/2002 | Chauvel et al. | 713/300 |
| 2002/0124196 A1* | 9/2002 | Morrow et al. | 713/320 |
| 2003/0158884 A1 | 8/2003 | Alford, Jr. | |
| 2003/0217090 A1* | 11/2003 | Chauvel et al. | 709/102 |
| 2004/0123297 A1 | 6/2004 | Flautner et al. | |
| 2005/0125701 A1* | 6/2005 | Hensbergen et al. | 713/320 |
| 2005/0149927 A1 | 7/2005 | Abe | |
| 2006/0265712 A1* | 11/2006 | Zhou et al. | 718/102 |
| 2007/0016643 A1 | 1/2007 | Boss et al. | |
| 2007/0079150 A1 | 4/2007 | Belmont et al. | |
| 2007/0094525 A1 | 4/2007 | Uguen et al. | |
| 2007/0143159 A1 | 6/2007 | Dillard et al. | |
| 2007/0157207 A1 | 7/2007 | Kim et al. | |

(Continued)

OTHER PUBLICATIONS z/Architecture Principles of Operation, IBM Publication No. SA22-7832-07, Feb. 2009, pp. 1344

(Continued)

*Primary Examiner* — Abdullah Al Kawsar
(74) *Attorney, Agent, or Firm* — Steven Chiu, Esq.; Blanche E. Schiller, Esq.; Heslin Rothenberg Farley & Mesiti P.C.

(57) ABSTRACT

Execution of tasks on accelerator units is managed. The managing includes multi-level grouping of tasks into groups based on defined criteria, including start time of tasks and/or deadline of tasks. The task groups and possibly individual tasks are mapped to accelerator units to be executed. During execution, redistribution of a task group and/or an individual task may occur to optimize a defined energy profile.

21 Claims, 6 Drawing Sheets

(56) References Cited

U.S. PATENT DOCUMENTS

| | | |
|---|---|---|
| 2007/0220294 A1 | 9/2007 | Lippett |
| 2007/0266385 A1 | 11/2007 | Flautner et al. |
| 2008/0059769 A1 | 3/2008 | Rymarczyk et al. |
| 2008/0098395 A1* | 4/2008 | Backer .................. 718/102 |
| 2008/0141265 A1* | 6/2008 | Choi ...................... 718/105 |
| 2008/0209238 A1 | 8/2008 | Dolwin |
| 2009/0070772 A1* | 3/2009 | Shikano ................. 718/106 |
| 2009/0100437 A1* | 4/2009 | Coskun et al. ........ 718/105 |
| 2009/0144734 A1 | 6/2009 | Diez et al. |
| 2009/0187775 A1* | 7/2009 | Ishikawa ................ 713/310 |
| 2009/0199193 A1 | 8/2009 | Jackson |
| 2009/0217272 A1* | 8/2009 | Bortnikov et al. .... 718/101 |
| 2009/0254660 A1 | 10/2009 | Hanson et al. |
| 2009/0265568 A1 | 10/2009 | Jackson |
| 2009/0265712 A1 | 10/2009 | Herington |
| 2010/0005474 A1 | 1/2010 | Sprangle et al. |
| 2010/0138837 A1* | 6/2010 | Olsson et al. ........... 718/102 |
| 2010/0269116 A1* | 10/2010 | Potkonjak ............... 718/103 |
| 2011/0131430 A1* | 6/2011 | Krishnamurthy et al. .... 713/320 |
| 2011/0239017 A1* | 9/2011 | Zomaya et al. ......... 713/320 |

OTHER PUBLICATIONS

Nutt, Gary J., "Operating Systems—A Modern Perspective," 2000, Addison-Wesley, 2nd Edition, p. 176.

* cited by examiner

MANAGING TASK EXECUTION ON ACCELERATORS

BACKGROUND

This invention relates, in general, to facilitating processing within a computing environment, and in particular, to managing task execution on accelerators of the computing environment.

Accelerators are used today to increase the processing capabilities of a server. In particular, accelerators coupled to the server are optimized to perform certain functions, enabling those functions to be performed at higher speeds than if those functions were performed by the server. When a function is reached in a program executed by the server, the server sends a request to an accelerator to perform the function. The accelerator performs the function and forwards the result back to the server. The server either performs further processing on the returned result or simply forwards the result to another accelerator, which then performs processing on the result and sends the result back to the server, again.

In production systems, typically all accelerators in a cluster of accelerators are powered up at the same time, even those accelerators that are not currently needed. Further, tasks are typically assigned to accelerators based on a round-robin approach.

BRIEF SUMMARY

The powering up of all accelerators, even those that are not currently used, wastes energy. Further, energy is wasted if one accelerator can perform the work of several accelerators in a timely manner. By managing task execution on accelerators, one or more accelerators may be shutdown to save energy. In one example, tasks are managed by multi-level grouping of the tasks into various groups and coordinating their execution within an energy profile.

The shortcomings of the prior art are overcome and additional advantages are provided through the provision of a computer program product for managing execution of tasks in a computing environment. The computer program product comprises a storage medium readable by a processing circuit and storing instructions for execution by the processing circuit for performing a method. The method includes, for instance, grouping a plurality of tasks into a group of tasks based on a predefined criteria, wherein the plurality of tasks are of a same class; and mapping the group of tasks to one or more accelerator units, the one or more accelerator units to execute the group of tasks, and wherein the mapping is based on an energy profile.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for managing execution of tasks on accelerator units of a computing environment. The managing includes, for instance, multi-level grouping of tasks into groups and coordinating their execution on accelerator units within an energy profile. As used herein, an accelerator unit is an accelerator, an accelerator socket on an accelerator, or an accelerator core in an accelerator socket.

Figure 1:
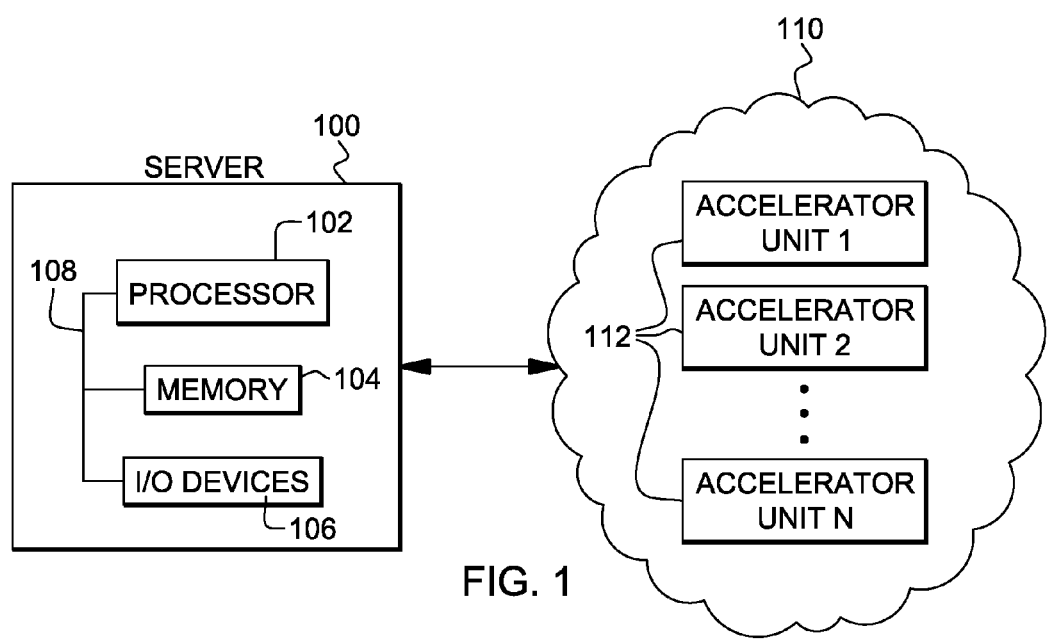
FIG. 1 depicts one embodiment of a computing environment to incorporate and use one or more aspects of the present invention.

One example of a computing environment to incorporate and use one or more aspects of the present invention is depicted in FIG. 1. In this example, a server 100 is coupled to an accelerator cluster (a.k.a., a set of accelerators) 110. Server 100 includes, for instance, one or more processors 102, memory 104, and one or more input/output (I/O) devices 106 coupled to one another via one or more buses 108. As examples, server 100 is a System p®, System x® or System z® server offered by International Business Machines Corporation (IBM®), Armonk, N.Y. IBM®, System p®, System x® and System z® are registered trademarks of International Business Machines Corporation, Armonk, N.Y. Other names used herein may be registered trademarks, trademarks or product names of International Business Machines Corporation or other companies.

In another embodiment, the server includes one or more partitions or zones. For example, the server is a logically partitioned System z® server based on the z/Architecture® offered by International Business Machines Corporation, Armonk, N.Y. The z/Architecture® is described in an IBM® publication entitled, "z/Architecture Principles of Operation," IBM Publication No. SA22-7832-07, February 2009, which is hereby incorporated herein by reference in its entirety. z/Architecture® is a registered trademark of International Business Machines Corporation, Armonk, N.Y.

Server 100 communicates with accelerator cluster 110 via, for instance, a network, such as PCI Express, Infiniband, Ethernet, etc. Accelerator cluster 110 includes, for instance, a plurality of accelerator units 112. In one example, one or more of the accelerator units are hardware accelerators 112, such as a plurality of blades in a blade center or chassis. Example accelerators include IBM® Cell BE blades; IBM® Datapower units; nVidia GPUs; and/or System p® or System x® blades, offered by International Business Machines Corporation. As further examples, the accelerator units are accelerator sockets on one or more blades or accelerator cores in one or more accelerator sockets. A cluster of accelerator units may include the same type of accelerator units or a mix of accelerator units. In one example, each accelerator unit has a switch associated therewith having one port as an input port from the server and one port as an output port to the server. In other examples, other ports may also be used.

In accordance with an aspect of the present invention, in order to manage execution of tasks, an optimizer running within the server maintains information regarding workload (e.g., tasks to be run) and accelerator units of the computing environment. Some workloads may run with higher energy efficiency on some types of accelerator units. Therefore, the optimizer stores a table (or other data structure) of workload type and accelerator unit type where energy efficiency is the best. In this example, energy efficiency relates to the energy used by the processor, memory and I/O. One particular example of this table is described with reference to FIG. 2A.

Figure 2A:
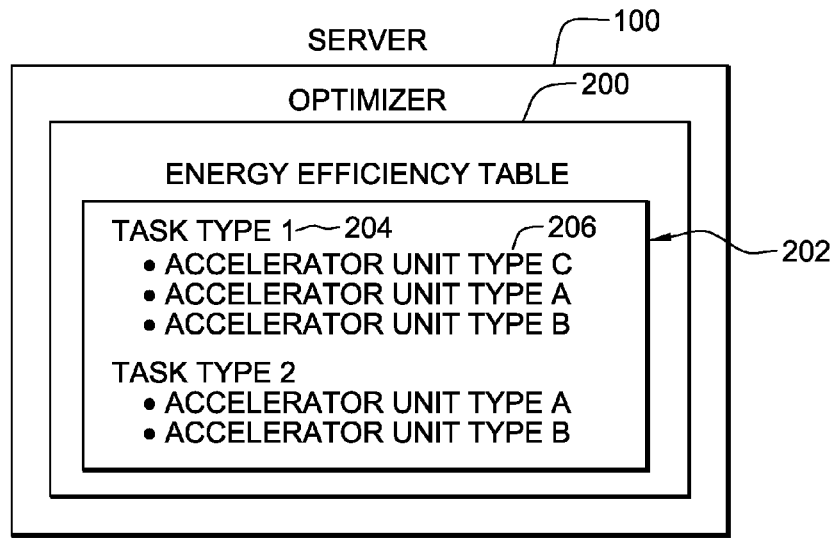
FIGS. 2A-2C depict various tables used to map tasks to accelerator units, in accordance with an aspect of the present invention.

Referring to FIG. 2A, a table 202, named an energy efficiency table, is stored within memory of an optimizer 200 executing within server 100. Table 202 includes, for instance, a plurality of task types 204, and a linked list of accelerator types 206 on which this task type can be executed. In this example, the linked list of accelerator types is arranged in order of best energy efficiency to the least. For example, assume Task Type 1 is a particular simulation for pricing of financial instruments, and further assume that Accelerator Unit Type C is IBM® Cell BE blades, which in this hypothetical example is the most efficient accelerator type for Task Type 1; Accelerator Unit Type A is a System x® blade, which is considered the second most efficient accelerator unit type for this type of task; and Accelerator Unit Type B is nVidia GPUs, which is considered the least efficient accelerator unit type for this task type.

Figure 2B:
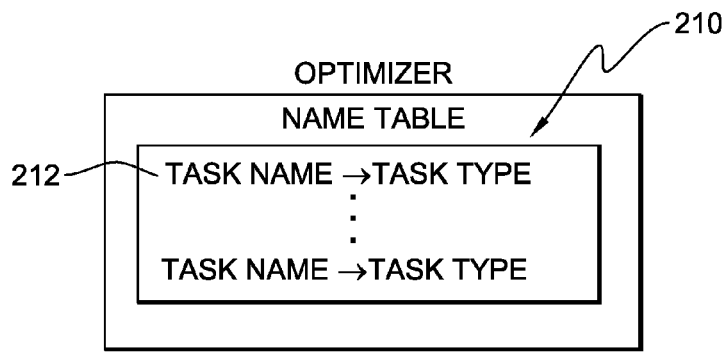

To associate the task type with a task name, another data structure stored within memory of the optimizer is utilized. For instance, referring to FIG. 2B, a name table 210 includes a plurality of entries 212, each with a task name and associated task type. For instance, a task name might be Pricing of Financial Instruments and the associated task type is simulation for pricing of financial instruments. Many other examples are possible.

Figure 2C:
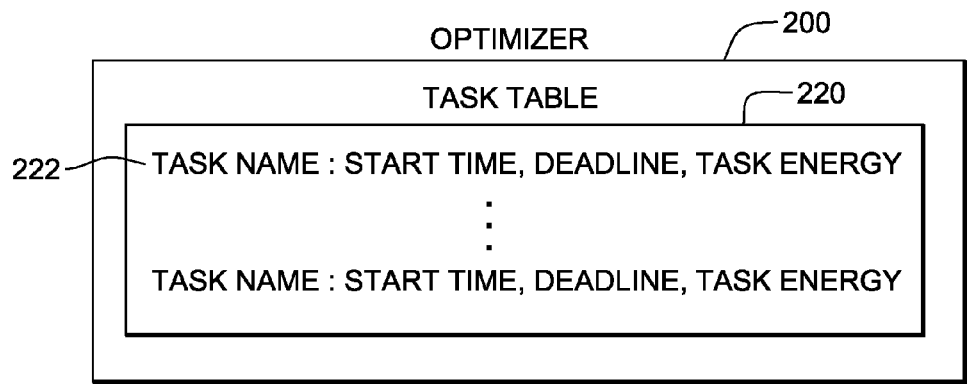

Additionally, the optimizer also includes a task table that maps the task name to information regarding the task. For example, as shown in FIG. 2C, a task table 220 includes a plurality of tasks 222, and for each task there is execution information, including, for instance, a start time for the task indicating when the task is to be scheduled to run; a deadline (required completion time) for the task indicating when the task is to be completed; and energy of the task (in watt-hours) indicating the amount of energy a task would use on particular accelerators. A start time of zero indicates the task can be scheduled when possible, but is to meet the deadline; and a deadline of zero indicates best effort. The task energy field is, for instance, a linked list of values corresponding to each accelerator unit type. That is, profiling is performed in which the task is executed on one or more accelerator units and the amount of energy used by the task on that accelerator unit is measured by instrumentation on the accelerator. One example of such instrumentation is the Active Energy Manager provided by International Business Machines Corporation.

In one embodiment, there are three classes of tasks: known constant execution time (KCET) tasks, in which the execution time of the tasks is known and constant; unknown constant execution time (UCET) tasks, in which the execution time is unknown at this point, but it can be determined by running the task and it is constant; and long running unknown execution time (LRUET) tasks, in which the execution time is variable.

Within a class of tasks, tasks may be grouped or clustered based on predefined criteria. For instance, tasks within the KCET class may be grouped based on start time and/or deadline of tasks. As a particular example, all tasks in the KCET class having a deadline of 10 microseconds or less are grouped together in one group. In a further example, the group may be constrained to a maximum number of tasks. Thus, in this particular example, it may be that up to 15 tasks having a deadline of 10 microseconds or less are grouped in one group. Many other examples are also possible, including other predefined criteria and other maximum group sizes. Further, in other embodiments, tasks in other classes may also be grouped based on one or more criteria.

Moreover, in one example, a group may be further defined or sub-groups of the group may be created based on additional criteria, such as an energy profile that considers, for instance, an accelerator energy-cap, an accelerator power-cap and task energy, as described herein.

Each accelerator unit has associated therewith an energy-cap (in watt-hours) specifying the maximum energy level for the accelerator unit; power-cap (in watts) specifying the maximum power level for the accelerator unit; aggregate energy consumption (watt-hours) specifying the total energy consumption by the accelerator since it was last powered up; and average power consumption (watts) specifying the average power consumption since the accelerator was last powered on. The energy-cap and power-cap may be assigned by the system administrator. Further, a group of accelerators may also have an energy-cap associated with it (group energy-cap). The sum total of energy of each task in the group added to the aggregate energy consumption is not to exceed the energy-cap of the accelerator. Similarly, the sum of average power of each task in the task group is not to exceed the power-cap of the accelerator. The energy information may be stored in a descriptor within the server, as an example.

One embodiment of the logic associated with grouping tasks and assigning tasks to accelerator units is described with reference to FIG. 3. Initially, the optimizer groups tasks, such as the tasks in the KCET class, according to one or more predefined criterion (e.g., task start time and deadline). In one example, this grouping is across processes (a.k.a., address spaces) of a computing unit, in which the computing unit is a server, a logical partition or a zone, as examples, STEP 300. To facilitate the grouping, known clustering techniques may be used and the range and size of the group is determined by a designer. The designer may consider, for instance, the particular tasks, accelerator units that may execute those tasks, and/or an energy profile associated with the tasks and accelerator units (e.g., accelerator energy-cap, accelerator power-cap, task energy and/or other energy criteria). As an example, known clustering techniques may be used to cluster tasks that fall into an ellipse with the major and minor axis defined by start time and deadline. Tasks are allowed into the cluster, so that energy/power constraints are met, along with the ability to meet start times and deadlines using known methods in schedulability analysis.

Each group of tasks is treated as one unit, in which the tasks of the group run together and should end around the same time (within certain bounds). The tasks of a particular group would typically run on one accelerator unit unless the group is too large to fit on one accelerator unit; then, other accelerator units would be used. For instance, in a first pass, a group would include all tasks that fit within required start time and deadline bounds. In a second pass, this group may be divided into sub-groups that run on separate physical accelerators to meet energy constraints. Sub-groups that span multiple accelerators are dispatched and managed similar to a single task group mapped to a single physical accelerator.

It is noted that some tasks (such as UCET and LRUET) may not be grouped. However, these tasks are still are assigned to accelerator units and, in one example, are assigned based on the energy profile (e.g., accelerator energy-cap, accelerator power cap, task energy and/or other energy criteria).

Subsequent to performing the grouping, the optimizer assigns the groups of tasks and tasks not in a group to accelerator units, STEP 302. In one example, this initial assigning of accelerator units to task groups or individual tasks is based on a policy that includes, for instance, meeting start times and deadlines and satisfies an energy profile. For instance, the optimizer assigns a group of tasks or individual tasks to the most efficient accelerator unit (based on the energy efficiency table) for that type of task that can satisfy the other requirements, such as start and required completion time. Further, the assignment adheres to other energy criteria, such as not exceeding the accelerator energy-cap or accelerator power-cap. If an accelerator unit cannot meet all of these requirements, then one or more accelerator units that best meet these requirements within a defined policy are selected. In this one example, the groups of tasks are assigned first, and then, the individual tasks. Further, initially, if there are idle accelerator units subsequent to assigning the groups, then an attempt is made to assign UCET or LRUET tasks on those idle accelerator units. If there are no such tasks to run, then other tasks may be run on those units or the units may be powered down or put in a hibernate state (e.g., standby or hibernate).

Thereafter, the optimizer informs the processes of the groupings and assigned accelerator units, STEP 304. In particular, each process having one or more of the assigned tasks is informed of the identifier of its task group, if any, as well as the group's or individual task's assignment on a particular accelerator unit (i.e., the identifier of the accelerator unit). Subsequently, the computing unit executing the processes places the tasks on the assigned accelerator units, STEP 306, and the optimizer starts the tasks, STEP 308.

During execution of the tasks, one or more of the tasks provide performance and energy information. In one example, performance information is provided for an UCET task after running and profiling that task one time. This information is stored on the optimizer, STEP 310. Further, in one example, a task may periodically (as chosen by a designer) inform the optimizer of its status and/or completion, STEP 312.

In accordance with an aspect of the present invention, the execution of the tasks running on the accelerator units is managed in order to optimize energy efficiency of the accelerator units. In particular, execution of the groups of tasks and individual tasks is coordinated within an energy profile, which is known to the optimizer. To accomplish this, periodically, execution of the tasks on the assigned accelerator units is analyzed to determine if any of the tasks are to be moved from one accelerator unit to another. This analysis is described with reference to FIGS. 4A-4B, which depicts one example of a remapping function.

Figure 3:
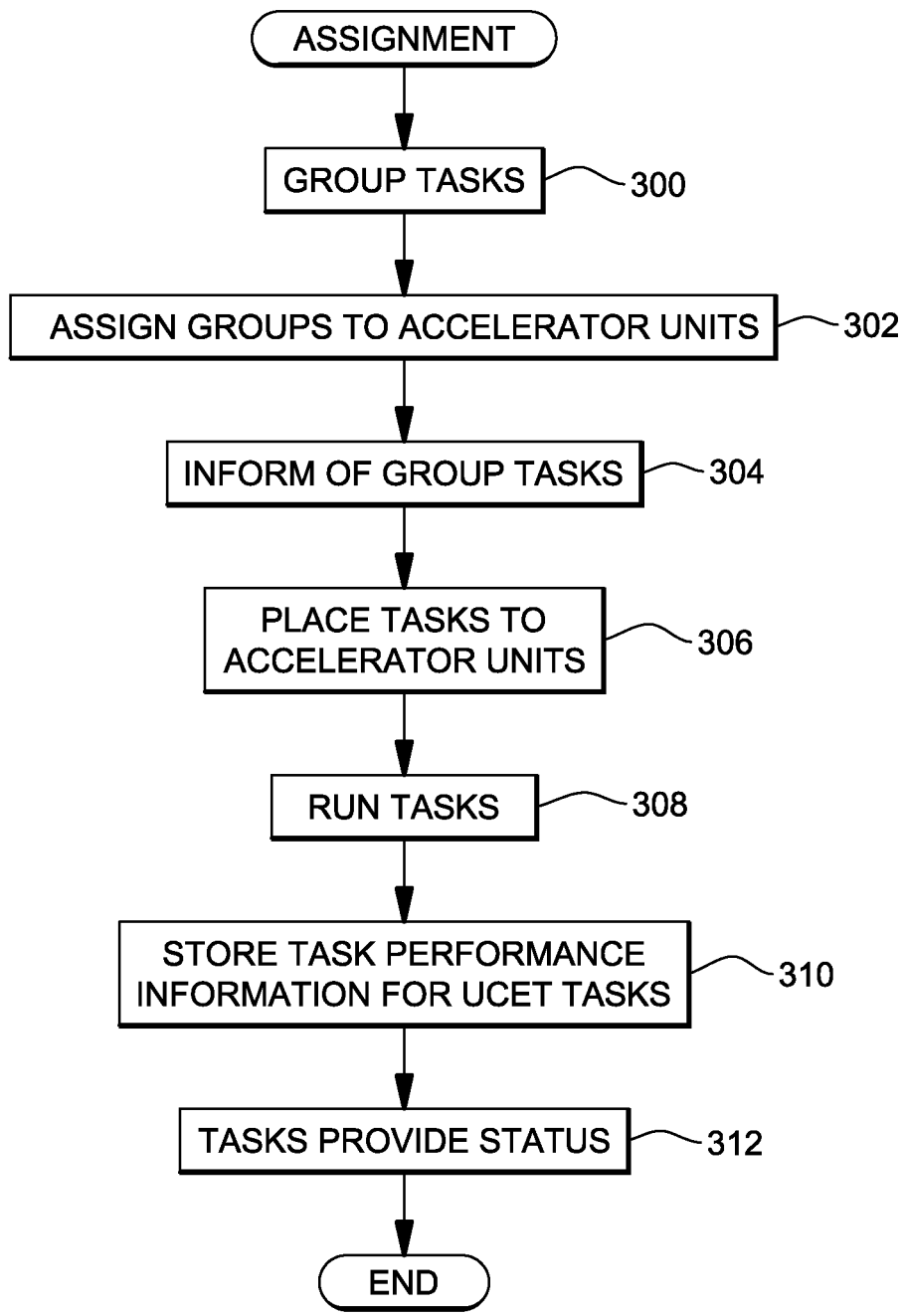
FIG. 3 depicts one embodiment of the logic to assign tasks to accelerator units, in accordance with an aspect of the present invention.
Figure 4A:
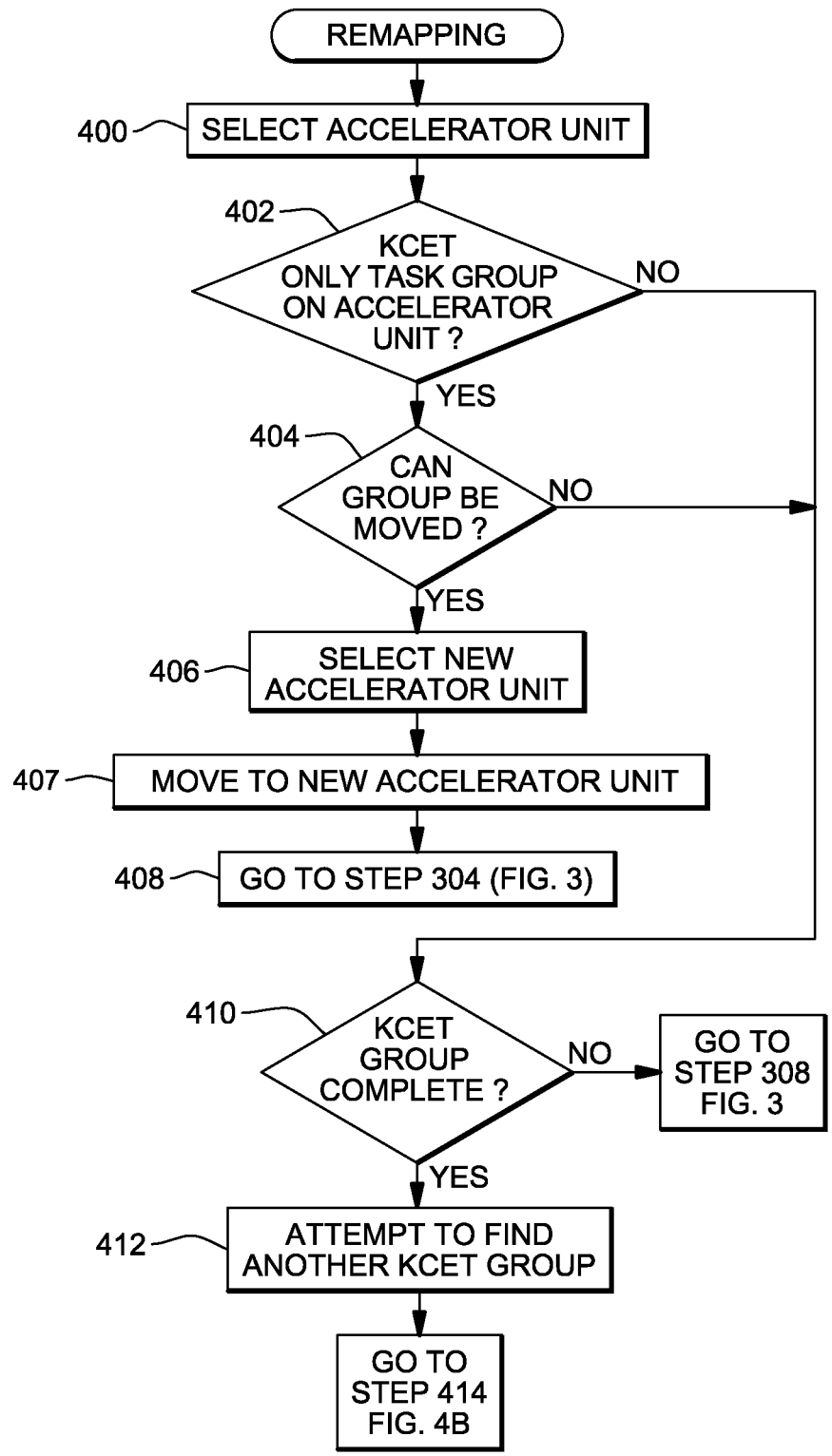
FIGS. 4A-4B depict one embodiment of the logic to redistribute tasks, in accordance with an aspect of the present invention.

Referring initially to FIG. 4A, an accelerator unit to be examined is selected, STEP 400. This accelerator unit is, for instance, one that has a lower utilization. This information is obtained by the optimizer based, for instance, on the initial assignment, as well as the status information provided by the tasks in STEP 312 (FIG. 3). This accelerator unit is examined to determine if the one or more tasks running on that accelerator unit may be run on another accelerator unit to form a high utilization accelerator unit which would be more efficient.

For the selected accelerator unit, a determination is made as to whether a known constant execution time task (KCET) group is the only task group executing on this accelerator unit, INQUIRY 402. If so, a determination is made as to whether it can be moved, INQUIRY 404. In one example, this determination is made by checking whether it makes sense to move the group or would it, for instance, take longer to move the group and finish execution than leave it on the current accelerator unit. For this check, the following equation is used, as an example: Is Texec-time+Tmigrate<<(very much less than) deadline, in which Texec-time is the current time after a task started executing, in seconds; Tmigrate is the time it takes to migrate tasks from one accelerator unit to another accelerator unit (profiled apriori in seconds); and deadline is a task deadline in seconds (deadline>=known profiled task execution time).

If it is determined that the group of tasks can be moved, then a new accelerator unit is selected, STEP 406. In one example, the new accelerator unit is chosen based on various rules of a policy, including, for instance, whether a combination of the new work and already executing work might bring the accelerator unit to an optimal utilization point that might consume optimal energy; task, accelerator type combination; and if I/O of various tasks can be aggregated for optimal energy use. In one example, the optimizer uses the energy efficiency table in making its decision. Further, in one embodiment, the energy-cap and power-cap rules are observed while making the task group replacement decision to a new accelerator. For instance, the rules observed during initial mapping of a task group to a new accelerator are observed during remapping.

Thereafter, the task group is moved, STEP 407. The optimizer ensures that tasks with the correct binary for the new accelerator type are moved over. The task may have intermediate results and state, which are provided to the new accelerator unit. Processing then continues with STEP 304 of FIG. 3 in which the processes are informed of the change, STEP 408 (FIG. 4A).

Returning to INQUIRY 402, if the known constant execution time task group is not the only task group executing on the accelerator unit or if the group cannot be moved, INQUIRY 404, then a further determination is made as to whether the known constant execution type time group has completed, INQUIRY 410. If not, processing continues with STEP 308 of FIG. 3, in which tasks of the group continue to execute.

Referring to INQUIRY 410 (FIG. 4A), if the KCET group has completed, then an attempt is made to find another known constant execution time task group to run on this accelerator unit, STEP 412. Again, in seeking a KCET group to move to this accelerator unit, the policy is considered. A new group that has recently been formed by the optimizer may also be assigned. If another known constant execution time group is found, INQUIRY 414 (FIG. 4B), then the group is moved from its current accelerator unit to this accelerator unit being analyzed, STEP 416.

Figure 4B:
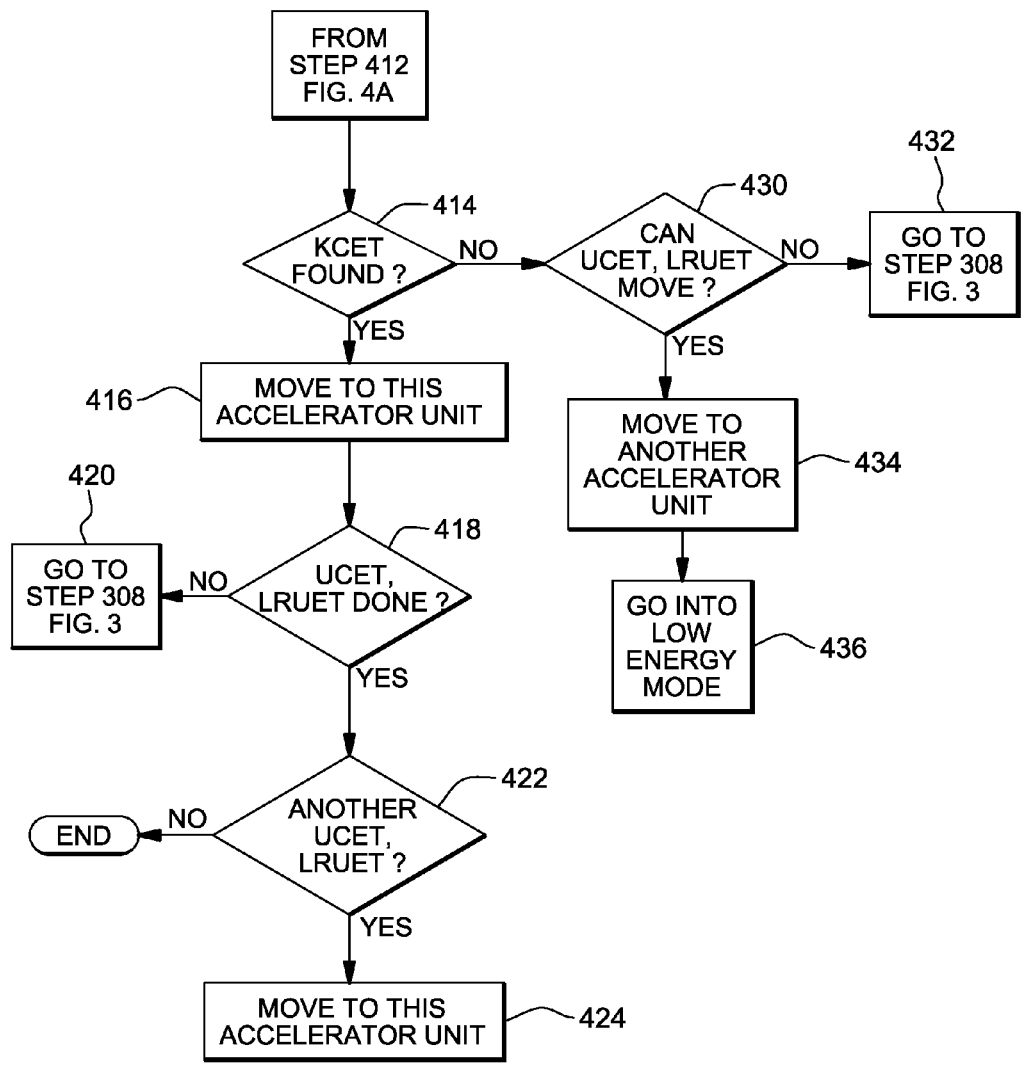

Further, a determination is made as to whether other tasks that may be running on this accelerator, such as an unknown constant execution time task or a long running unknown execution time task, are complete, INQUIRY 418. If they are not complete, then processing continues with STEP 308 (FIG. 3), in which the tasks continue to execute, STEP 420 (FIG. 4B). If, however, an UCET or LRUET executing on this accelerator has completed, then a determination is made as to whether another UCET or LRUET can be moved to this accelerator from another accelerator or newly arrived for placement by the optimizer, INQUIRY 422. In making this determination, the policy is considered, including whether it makes sense to move it in terms of remaining execution time and the energy profile (e.g., energy-cap, power-cap, task energy and/or other energy criteria). If an UCET or LRUET cannot be moved, then processing for this selected accelerator unit is complete, and another accelerator unit may be analyzed. (In a further embodiment, this logic is performed in parallel by multiple optimizers to analyze multiple accelerators concurrently.) However, if an UCET or LRUET can be moved from another accelerator unit to this one, then it is moved, STEP 424.

Returning to INQUIRY 414, if a KCET group cannot be found, then a further determination is made as to whether any UCET or LRUET tasks executing on this accelerator can be moved from this accelerator to another accelerator, INQUIRY 430. In searching for another accelerator, various rules within the policy are considered, including, for instance: a combination of the new work and already executing work might bring the accelerator unit to an optimal utilization point that might consume optimal energy (e.g., task combinations executing on the same accelerator might use less energy, as an example). Various energy and power metrics stored along with each accelerator, in addition to task energy values, are used for this purpose.

If those tasks cannot be moved, then they stay on the same accelerator, and processing continues with STEP 308 (FIG. 3). On the other hand, if the tasks can be moved, then they are moved from this accelerator to another accelerator, STEP 434 (FIG. 4B). Since all of the groups and individual tasks have been moved from this accelerator, the accelerator can go into low energy mode, STEP 436. For instance, it may be powered down completely or may be placed in a hibernate state, such as standby or hibernate. As examples, an accelerator unit may be turned off using power gating or forced into a low energy state using clock gating. This is usually the last resort if no other work can be moved from other accelerators or no new work has arrived at the accelerator. The accelerator may also enter low power states based on designer settings of work arrival. An accelerator may remain in a power-up state for a designer defined period so that newly arrived task groups may be instantly assigned. An accelerator may then be induced into lower energy states as time passes in correspondence to lowering probability of new work being assigned. Such time periods may be defined by the designer based on mix of workloads and accelerator types.

Described in detail above is a multi-level task grouping/assignment technique and post-dispatch redistribution capability that enables certain tasks to be grouped, task groups and individual tasks to be initially assigned to accelerator units to be executed, and task groups or tasks to be dynamically redistributed during task execution. The redistribution is cognizant of communication and startup costs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
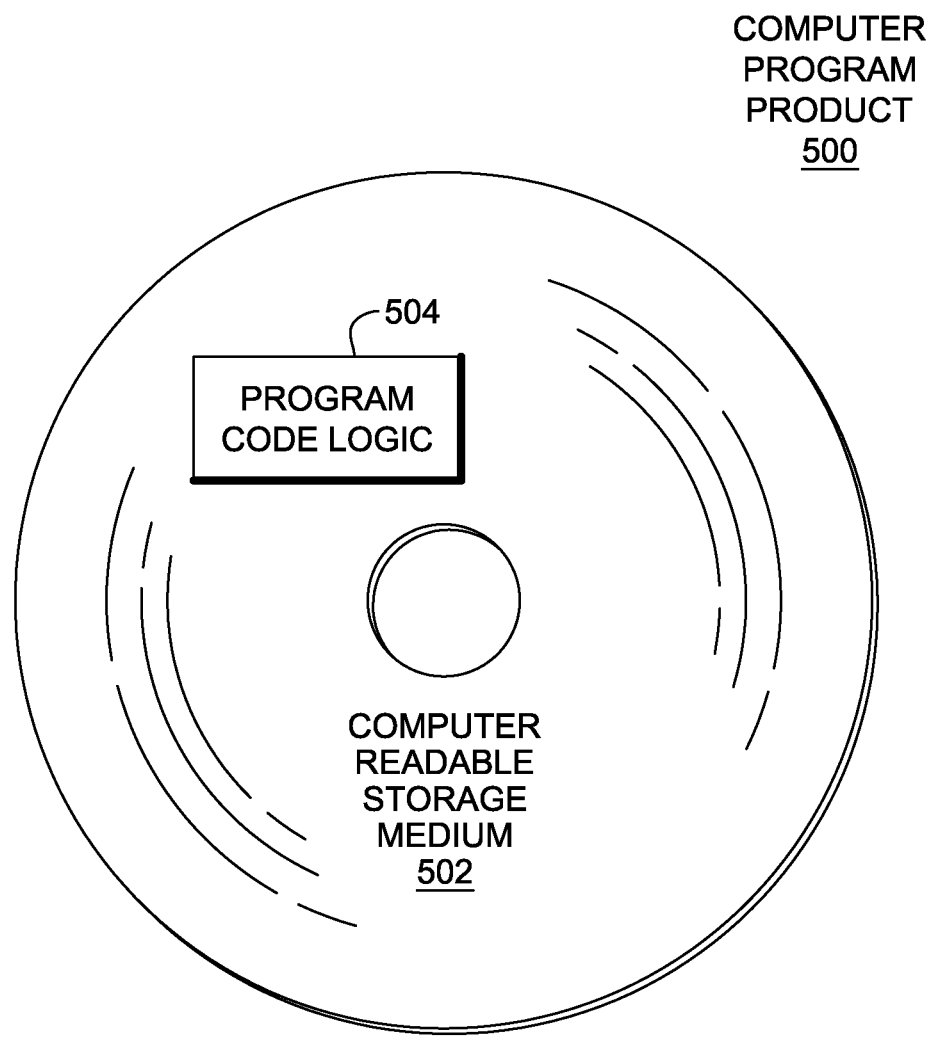
FIG. 5 depicts one embodiment of a computer program product incorporating one or more aspects of the present invention.

Referring now to FIG. 5, in one example, a computer program product 500 includes, for instance, one or more computer readable storage media 502 to store computer readable program code means or logic 504 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other criteria may be used for mapping and/or redistribution; and/or the energy policy may include additional, less or different policies. Moreover, more or fewer accelerator units, as well as other types, may be managed without departing from the spirit of the present invention. Many other revisions are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/ or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/ or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for managing task execution in a computing environment, the computer program product comprising:
   a non-transitory storage medium readable by a processing circuit and storing instructions for execution by the processing circuit for performing a method comprising:
      grouping a plurality of tasks, prior to execution, into a group of tasks based on a predefined criteria, wherein the plurality of tasks are of a same class of tasks, and the predefined criteria comprises task start times and deadlines for the plurality of tasks, and wherein the plurality of tasks in the group of tasks are to terminate at substantially a same time; and
      mapping, prior to execution, the group of tasks and one or more tasks of one or more other classes of tasks to one or more accelerator units, the one or more accelerator units to execute the group of tasks and the one or more tasks from the one or more other classes of tasks, wherein the class of tasks relates to a first type of execution time, the first type of execution time comprising a known constant execution time, and at least one class of tasks of the one or more other classes of tasks relates to at least one other type of execution time, the at least one other type of execution time being other than the known constant execution time, and wherein the mapping comprises assigning the group of tasks and the one or more tasks from the one or more other classes of tasks to the one or more accelerator units based on meeting the start times and deadlines for the group of tasks and based on an energy profile by not exceeding configurable maximum energy levels for the one or more accelerator units with total task energy of the group of tasks and the one or more tasks from the one or more other classes of tasks mapped to the one or more acceleration units, wherein the energy profile comprises the configurable maximum energy levels for the one or more accelerator units and task energy for the group of tasks and the one or more other classes of tasks.

2. The computer program product of claim 1, wherein the predefined criteria further includes at least one of energy information and power information.

3. The computer program product of claim 1, further comprising:
   executing at least one task on an accelerator unit of the one or more accelerator units; and
   dynamically remapping the at least one task, during execution of the at least one task, from the accelerator unit to another accelerator unit.

4. The computer program product of claim 1, wherein the one or more other classes of tasks comprises at least one of an unknown execution time class and a long running unknown execution time class.

5. The computer program product of claim 1, further comprising:
   executing at least a portion of the group of tasks on an accelerator unit of the one or more accelerator units;
   executing at least one task of the one or more tasks on the accelerator unit;
   determining whether the at least a portion of the group of tasks has completed execution;
   based on determining the at least a portion of the group of tasks has completed execution, deciding whether the at least one task can be moved from the accelerator unit to another accelerator unit; and
   based on deciding the at least one task can be moved, moving the at least one task to the another accelerator unit.

6. The computer program product of claim 5, wherein the another accelerator unit is selected based on one or more of the following criteria: a combination of the at least one task and tasks already executing on the another accelerator bringing the another accelerator at least closer to optimal utilization; combination of the at least one task and type of accelerator unit; and efficiencies of input/output for tasks executing on the another accelerator unit.

7. The computer program product of claim 6, wherein the deciding is performed further based on a determination that another group of tasks of the same class is not to execute on the accelerator unit.

8. The computer program product of claim 5, further comprising placing the accelerator unit in a low energy state, based on no tasks currently executing on the accelerator unit.

9. The computer program product of claim 1, wherein the method further comprises determining whether a selected group of tasks executing on a selected accelerator unit of the one or more accelerator units is to be moved to another accelerator unit of the computing environment, the determining comprising:
   checking whether the selected group of tasks executing on the selected accelerator unit is a known constant execution time task group; and
   deciding, based on the selected group of tasks being a known constant execution time task group, whether the selected group of tasks is to be moved to the another accelerator unit, the deciding being based on whether it would take longer to move the selected group of tasks and finish executing the selected group of tasks on the another accelerator unit than leave the selected group of tasks on the selected accelerator unit to complete execution.

10. The computer program product of claim 9, wherein the checking further comprises checking whether the selected group of tasks is an only task group executing on the selected accelerator unit, and wherein the deciding comprises based on the selected group of tasks being a known constant execution time task group and the only task group executing on the selected accelerator unit, determining whether a current time after a task started plus a time to migrate the selected group of tasks is less, by a predefined amount, than a known profiled execution time for the selected group of tasks, and wherein the method further comprises:

based on the current time after the task started plus the time to migrate the selected group of tasks is less, by the predefined amount, than the known profiled execution time, moving the selected group of tasks to the another accelerator unit, the another accelerator unit chosen based on a policy, the policy including at least one of: a combination of the selected group of tasks and tasks already executing on the another accelerator unit bringing the another accelerator unit at least closer to optimal utilization, a combination of the selected group of tasks and type of accelerator unit, efficiencies of input/output for tasks executing on the another accelerator unit, and not exceeding a maximum energy limit or a maximum power limit for the another accelerator unit.

11. The computer program product of claim 1, wherein the energy profile further comprises at least one of not exceeding maximum power levels for the one or more accelerator units, and task energy.

12. The computer program product of claim 1, wherein the mapping comprises mapping a number of tasks of at least one of the group of tasks or the one or more tasks to a selected accelerator unit, the mapping the number of tasks including:
determining whether a sum total of energy of each task of the number of tasks added to an aggregate energy consumption for the selected accelerator unit exceeds the maximum energy level of the selected accelerator unit; and
proceeding with the mapping based on the maximum energy level of the selected accelerator unit not being exceeded.

13. A computer system for managing accelerators of a computing environment, the computer system comprising:
a memory; and
a processor in communications with the memory, wherein the computer system is capable of performing a method, said method comprising:
grouping a plurality of tasks, prior to execution, into a group of tasks based on a predefined criteria, wherein the plurality of tasks are of a same class of tasks, and the predefined criteria comprises task start times and deadlines for the plurality of tasks, and wherein the plurality of tasks in the group of tasks terminate at substantially a same time; and
mapping, prior to execution, the group of tasks and one or more tasks of one or more other classes of tasks to one or more accelerator units, the one or more accelerator units to execute the group of tasks and the one or more tasks from the one or more other classes of tasks, wherein the class of tasks relates to a first type of execution time, the first type of execution time comprising a known constant execution time, and at least one class of tasks of the one or more other classes of tasks relate to at least one other type of execution time, the at least one other type of execution time being other than the known constant execution time, and wherein the mapping comprises assigning the group of tasks and the one or more tasks from the one or more other classes of tasks to the one or more accelerator units based on meeting the start times and deadlines for the group of tasks and based on an energy profile by not exceeding configurable maximum energy levels for the one or more accelerator units with total task energy of the group of tasks and the one or more tasks from the one or more other classes of tasks mapped to the one or more accelerration units, wherein the energy profile comprises the configurable maximum energy levels for the one or more accelerator units and task energy for the group of tasks and the one or more other classes of tasks.

14. The computer system of claim 13, wherein the method further comprises:
executing at least one task on an accelerator unit of the one or more accelerator units; and
dynamically remapping the at least one task, during execution of the at least one task, from the accelerator unit to another accelerator unit.

15. The computer system of claim 13, wherein the method further comprises:
executing at least a portion of the group of tasks on an accelerator unit of the one or more accelerator units;
executing at least one task of the one or more tasks on the accelerator unit;
determining whether the at least a portion of the group of tasks has completed execution;
based on determining the at least a portion of the group of tasks has completed execution, deciding whether the at least one task can be moved from the accelerator unit to another accelerator unit; and
based on deciding the at least one task can be moved, moving the at least one task to the another accelerator unit.

16. The computer system of claim 15, wherein the method further comprises placing the accelerator unit in a low energy state, based on no tasks currently executing on the accelerator unit.

17. The computer system of claim 13, wherein the method further comprises determining whether a selected group of tasks executing on a selected accelerator unit of the one or more accelerator units is to be moved to another accelerator unit of the computing environment, the determining comprising:
checking whether the selected group of tasks executing on the selected accelerator unit is a known constant execution time task group and an only task group executing on the selected accelerator unit; and
deciding, based on the selected group of tasks being a known constant execution time task group and the only task group executing on the selected accelerator unit, whether the selected group of tasks is to be moved to the another accelerator unit, the deciding comprising determining whether a current time after a task started plus a time to migrate the selected group of tasks is less, by a predefined amount, than a known profiled execution time for the selected group of tasks; and
wherein the method further comprises based on the current time after the task started plus the time to migrate the selected group of tasks is less, by the predefined amount, than the known profiled execution time, moving the selected group of tasks to the another accelerator unit, the another accelerator unit chosen based on a policy, the policy including at least one of: a combination of the selected group of tasks and tasks already executing on the another accelerator unit bringing the another accelerator unit at least closer to optimal utilization, a combination of the selected group of tasks and type of accelerator unit, efficiencies of input/output for tasks executing on the another accelerator unit, and not exceeding a maximum energy limit or a maximum power limit for the another accelerator unit.

18. The computer system of claim 13, wherein the energy profile further comprises at least one of not exceeding maximum power levels for the one or more accelerator units, and task energy.

19. A method of managing task execution in a computing environment, the method comprising:

grouping, by a processor, a plurality of tasks, prior to execution, into a group of tasks based on a predefined criteria, wherein the plurality of tasks are of a same class of tasks, and the predefined criteria comprises task start times and deadlines for the plurality of tasks, and wherein the plurality of tasks in the group of tasks terminate at substantially a same time; and mapping, by the processor, prior to the execution, the group of tasks and one or more tasks of one or more other classes of tasks to one or more accelerator units, the one or more accelerator units to execute the group of tasks and the one or more tasks from the one or more other classes of tasks, wherein the class of tasks relates to a first type of execution time, the first type of execution time comprising a known constant execution time, and at least one class of tasks of the one or more other classes of tasks relates to at least one other type of execution time, the at least one other type of execution time being other than the known constant execution time, and wherein the mapping comprises assigning the group of tasks and the one or more tasks from the one or more other classes of tasks to the one or more accelerator units based on meeting the start times and deadlines for the group of tasks and based on an energy profile by not exceeding configurable maximum energy levels for the one or more accelerator units with total task energy of the group of tasks and the one or more tasks from the one or more other classes of tasks mapped to the one or more acceleration units, wherein the energy profile comprises the configurable maximum energy levels for the one or more accelerator units and task energy for the group of tasks and the one or more other classes of tasks.

20. The method of claim 19, further comprising:
executing at least one task on an accelerator unit of the one or more accelerator units; and
dynamically remapping the at least one task, during execution of the at least one task, from the accelerator unit to another accelerator unit.

21. The method of claim 19, further comprising:
executing at least a portion of the group of tasks on an accelerator unit of the one or more accelerator units;
executing at least one task of the one or more tasks on the accelerator unit;
determining whether the at least a portion of the group of tasks has completed execution;
based on determining the at least a portion of the group of tasks has completed execution, deciding whether the at least one task can be moved from the accelerator unit to another accelerator unit; and
based on deciding the at least one task can be moved, moving the at least one task to the another accelerator unit.

* * * * *